(12) United States Patent
Hung et al.

(10) Patent No.: US 9,889,402 B2
(45) Date of Patent: Feb. 13, 2018

(54) DEHUMIDIFYING BASE MATERIAL, AND DEVICE AND METHOD FOR FORMING THE SAME

(71) Applicant: INDUSTRIAL TECHNOLOGY RESEARCH INSTITUTE, Hsinchu (TW)

(72) Inventors: Ming-Lang Hung, Hsinchu (TW); Pen-Chang Tseng, Hsinchu (TW); Hsing-Ting Chen, Hsinchu (TW); Yu-Hao Kang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 92 days.

(21) Appl. No.: 15/078,508

(22) Filed: Mar. 23, 2016

(65) Prior Publication Data

US 2017/0014756 A1    Jan. 19, 2017

(30) Foreign Application Priority Data

Jul. 17, 2015 (TW) .............................. 104123197 A

(51) Int. Cl.
  *B01D 53/04* (2006.01)
  *B01D 53/28* (2006.01)
  (Continued)

(52) U.S. Cl.
  CPC ......... *B01D 53/28* (2013.01); *B01D 53/0438* (2013.01); *B01D 53/261* (2013.01);
  (Continued)

(58) Field of Classification Search
  CPC .. B01D 53/04; B01D 53/0438; B01D 53/261; B01D 53/28; B01D 2253/102;
  (Continued)

(56) References Cited

U.S. PATENT DOCUMENTS 2,038,071 A * 4/1936 Wilhelm ............ B01D 46/0038
  239/59
3,713,281 A * 1/1973 Asker ...................... B01J 8/008
  422/211
(Continued)

FOREIGN PATENT DOCUMENTS

CN    102369247 A    3/2012
JP    H0655071 A    3/1994
(Continued)

OTHER PUBLICATIONS

Machine-generated English translation of JP 2006-175300 A, published Jul. 2006.*

(Continued)

*Primary Examiner* — Frank Lawrence
(74) *Attorney, Agent, or Firm* — Rabin & Berdo, P.C.

(57) ABSTRACT

A dehumidifying base material and a device for forming the dehumidifying base material are provided. The dehumidifying base material is formed from a raw base material including a metal layer, an upper adhesive film, a lower adhesive film, an upper absorbent material layer, a lower absorbent material layer, an upper release film, and a lower release film. The raw base material is placed on a material placement part and passes a first release roller, an upper absorbent adhesive part, a second release roller, and a lower absorbent adhesive part sequentially to form the dehumidifying base material. The dehumidifying base material with an absorbent material applied onto two sides thereof is compressed, and is rolled by a base material rolling part.

19 Claims, 8 Drawing Sheets

(51) Int. Cl.
    *B01D 53/26*     (2006.01)
    *B01J 20/28*     (2006.01)
    *B01J 20/26*     (2006.01)
    *B01J 20/10*     (2006.01)
    *B01J 20/18*     (2006.01)
    *B01J 20/20*     (2006.01)
    *B32B 1/00*     (2006.01)

(52) U.S. Cl.
    CPC ............. B01J 20/103 (2013.01); B01J 20/18 (2013.01); B01J 20/205 (2013.01); B01J 20/262 (2013.01); B01J 20/28035 (2013.01); B01J 20/28047 (2013.01); B32B 1/00 (2013.01); *B01D 2253/102* (2013.01); *B01D 2253/104* (2013.01); *B01D 2253/106* (2013.01); *B01D 2253/108* (2013.01); *B01D 2259/40096* (2013.01)

(58) Field of Classification Search
    CPC ........ B01D 2253/104; B01D 2253/106; B01D 2253/108; B01D 2259/40096; B05C 1/08; B32B 1/00; B01J 20/18; B01J 20/205; B01J 20/262; B01J 20/28035; B01J 20/28047
    USPC .................................... 96/108, 154; 428/143
    See application file for complete search history.

(56) References Cited

U.S. PATENT DOCUMENTS

| | | | |
|---|---|---|---|
| 4,699,681 A * | 10/1987 | Kasmark, Jr. | B01D 46/0001 156/192 |
| 6,227,383 B1 | 5/2001 | De Ruiter et al. | |
| 6,352,578 B1 * | 3/2002 | Sakata | B01D 53/02 55/385.2 |
| 6,749,940 B1 | 6/2004 | Terasaki et al. | |
| 2004/0134355 A1 * | 7/2004 | Kasmark, Jr. | B01D 39/163 96/154 |
| 2012/0272829 A1 * | 11/2012 | Fox | B01D 39/163 96/154 |

FOREIGN PATENT DOCUMENTS

| | | |
|---|---|---|
| JP | H0889744 A | 4/1996 |
| JP | H10216458 A | 8/1998 |
| JP | H11304383 A | 11/1999 |
| JP | 3080796 U | 10/2001 |
| JP | 2001345175 A | 12/2001 |
| JP | 2004333021 A | 11/2004 |
| JP | 2006175300 A | 7/2006 |
| JP | 2013202506 A | 10/2013 |
| JP | 2015057286 A | 3/2015 |
| TW | I313626 B | 8/2009 |

OTHER PUBLICATIONS

Taiwan Patent Office, Office Action dated Jan. 25, 2017.
Glazneva et al., Kinetics of water adsorption/desorption under isobaric stages of adsorption heat transformers: The effect of isobar shape, International Journal of Heat and Mass Transfer,20080426,50(2009), pp. 1774-1777.
Mihajlo et al., Influence of Elevated Pressure on Sorption in Desiccant Wheels, Numerical Heat Transfer,20040426,Part A,45:, pp. 869-886 (2004).
Niu et al., Heat transfer and friction coefficients in corrugated ducts confined by sinusoidal and arc curves, International Journal of Heat and Mass Transfer, 20010429,45(2002), pp. 571-578.
Golubovic et al., Sorption properties for different types of molecular sieve and their influence on optimum dehumidification performance of desiccant wheels, International Journal of Heat and Mass Transfer,20060524,49(2006), pp. 2802-2809.
Ge et al., A review of the mathematical models for predicting rotary desiccant wheel, T.S. Ge, Y. Li, R.Z. Wang, Y.J. Dai, Renewable and Sustainable Energy Reviews, 20070122,12(2008), pp. 1485-1528.
Abe et al., Effectiveness of Energy Wheels From Transient Measurements, O.O. Abe, C.J. Simonson, R.W. Besant, W. Shang, International Journal of Heat and Mass Transfer, 20051013,49(2006)52, pp. 52-62.
Japanese Patent Office, Office Action dated Dec. 19, 2016.

* cited by examiner

DEHUMIDIFYING BASE MATERIAL, AND DEVICE AND METHOD FOR FORMING THE SAME

CROSS-REFERENCE TO RELATED APPLICATION

The present application is based on, and claims priority from Taiwanese Application Number 104123197, filed Jul. 17, 2015, the disclosure of which is hereby incorporated by reference herein in its entirety.

BACKGROUND

1. Technical Field

This disclosure relates to dehumidifying base material manufacturing techniques, and to a dehumidifying base material, a dehumidifying base material forming device, and a method for forming a dehumidifying base material.

2. Description of Related Art

A dehumidifying base material of a dehumidifying component in a dehumidifying drying apparatus is produced by manual adhesion. When the dehumidifying base material is manually adhered, an adhesive film will be adhered unevenly, an absorbent material is likely to be fell, and the processing speed is too slow. As a result, the dehumidifying base material has unstable quality and insufficient efficiency. An inorganic gel, such as silicon oxide and aluminum oxide and an organic gel such as poly vinyl butyral (PVB) that are used to make the dehumidifying base material suffer from secondary hardening in a high temperature environment, which results in a component distortion problem.

Given the above, the market needs a device that forms a dehumidifying base material automatically, so as to promote the formation quality of the dehumidifying base material and the efficiency of dehumidifying components. During the automatic formation of a dehumidifying base material, it is the primary consideration that an absorbent material has to be adhered to an adhesive film evenly. Preferably, the absorbent material is adhered to the entire surface of the adhesive film evenly. During the formation of the dehumidifying base material, in order for the absorbent material to be adhered to the entire surface of the adhesive film evenly, the supplying amount of the absorbent material has to be controlled accurately. Too less the amount of the absorbent material cannot be adhered to the adhesive film securely, which results in weak efficiency. Too much the amount of the absorbent material will have a portion thereof fell from the adhesive film and is wasted.

Therefore, providing a dehumidifying base material forming device that forms dehumidifying base material automatically and applies an absorbent material onto the entire surface of an adhesive film without overusing the absorbent material is becoming one of the important issues in the art.

SUMMARY

The disclosure provides a dehumidifying base material, comprising: a metal layer; an upper adhesive film attached to a side surface of the metal layer; a lower adhesive film attached to another side surface of the metal layer; an upper absorbent material layer attached to the upper adhesive film; and a lower absorbent material layer attached to the lower adhesive film.

The disclosure further provides a device for forming a dehumidifying base material, comprising: a material placement part configured to place a raw base material comprising a metal layer, an upper adhesive film, a lower adhesive film, an upper release film, and a lower release film; an upper release film rolling part configured to roll the upper release film and positioned around a travelling route of the raw base material beyond the material placement part; an upper absorbent adhesive part configured to discharge the absorbent material onto the upper adhesive film and positioned around a travelling route of the raw base material beyond the upper release film rolling part after the upper release film being released, the upper absorbent adhesive part further comprising a first material bucket having an absorbent material contained therein and a first material discharging seat; a lower release film rolling part configured to roll the lower release film and positioned around a traveling route of the raw base material beyond the upper absorbent adhesive part; a lower absorbent adhesive part configured to discharge the absorbent material onto the lower adhesive film and positioned around a travelling route of the raw base material beyond the lower release film rolling part after the lower release film is released, the lower absorbent adhesive part further comprising a second material bucket having the absorbent material contained therein and a second material discharging seat; a roller set disposed along the travelling route of the raw base material or a travelling route of the dehumidifying base material and being in contact with the raw base material or the dehumidifying base material to drive the raw base material or the dehumidifying base material to move forward; a compression roller set positioned at the travelling route of the dehumidifying base material beyond the lower absorbent adhesive part and being in contact with the absorbent material of the dehumidifying base material to compress the dehumidifying base material having the upper adhesive film and the lower adhesive film with the absorbent material applied thereon; and a base material rolling part positioned at an end of the travelling route of the dehumidifying base material beyond the compression roller set and configured to roll the dehumidifying base material compressed by the compression roller set.

The disclosure yet further provides a method for forming a dehumidifying base material, comprising: providing a raw base material comprising a metal layer, an upper adhesive film, a lower adhesive film, an upper release film and a lower release film; partially releasing the upper release film and the lower release film of the raw base material, and rolling an end of the upper release film and an end of the lower release film onto different rolling parts; passing the raw base material to different material discharging seats horizontally and vertically; rolling one end of the raw base material onto an end rolling part; adjusting rotation speeds of motors to continuously release the upper release film and apply an absorbent material onto the upper adhesive film of the raw base material; continuously releasing the lower release film of the raw base material; applying the absorbent material onto the lower adhesive film of the raw base material to form the dehumidifying base material; compressing the dehumidifying base material having the upper adhesive film and the lower adhesive film with the absorbent material applied thereonto; and rolling the compressed the dehumidifying base material.

In the device for forming the dehumidifying base material and the method for forming the dehumidifying base material according to the disclosure, a raw base material comprising a metal layer, an upper adhesive film, a lower adhesive film, an upper release film and a lower release film is provided. Also provided is a device comprising a material placement part, an upper release film rolling part, an upper absorbent adhesive part, a lower release film rolling part, a lower absorbent adhesive part, a roller set, a compression roller set and a base material rolling part. Through a simple process, an absorbent material is applied onto the upper and lower adhesive films. A feller gage adjusts the position of the controlling panel, and a material discharging interval that corresponds to the particle diameter of only one absorbent material exists when the raw base material passes the upper and lower absorbent adhesive parts. The absorbent material can fall and be applied onto the upper and lower adhesive films in a great amount. Since the material discharging interval is around the particle diameter of the absorbent material, no excess absorbent material will fall onto the upper and lower adhesive films. Therefore, the problems that much of the absorbent material is wasted and the absorbent material is applied unevenly are solved. As such, the dehumidifying base material can be formed automatically. Also, the raw material is saved, and the yield is increased.

BRIEF DESCRIPTION OF DRAWINGS

The disclosure can be more fully understood by reading the following detailed description of the preferred embodiments, with reference made to the accompanying drawings, wherein.

DETAILED DESCRIPTION

Figure 2:
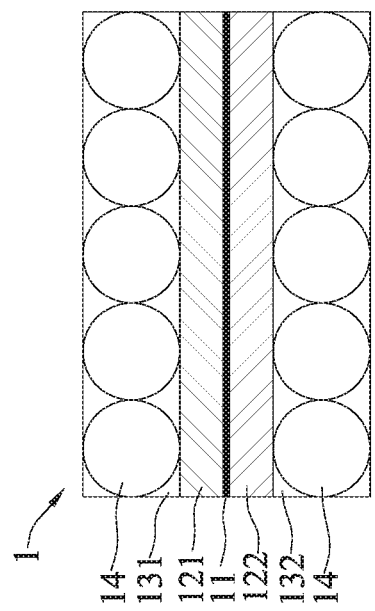
FIG. 2 is a schematic diagram of a raw base material according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
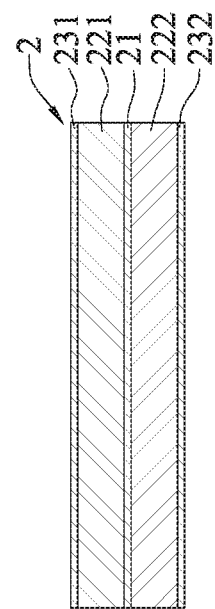
FIG. 1 is a schematic diagram of a dehumidifying base material according to the disclosure.

Referring to FIG. 1, a schematic diagram of a dehumidifying base material 1 of an embodiment according to the disclosure is provided. The dehumidifying base material 1 comprises a metal layer 11, an upper adhesive film 121, a lower adhesive film 122, an upper absorbent material layer 131 and a lower absorbent material layer 132. The upper adhesive film 121 is attached to a side surface of the metal layer 11. The lower adhesive film 122 is attached to another side surface of the metal layer 11. The upper absorbent material layer 131 and the lower absorbent material layer 132 are attached to the upper adhesive film 121 and the lower adhesive film 122, respectively. In an embodiment, the upper and lower absorbent material layers 131 and 132 are made of an absorbent material 14, and the absorbent material 14 may be a porous material, such as silica gel, activated aluminum oxide, zeolite and active carbon, and conducts heat generated by the metal layer 11 to the upper and lower absorbent material layers 131 and 132, to dehydrate the upper and lower absorbent material layers 131 and 132. In an embodiment, the thickness of the upper and lower absorbent material layers 131 and 132 is twice the thickness of the upper and lower adhesive films 121 and 122.

In an embodiment, the metal layer 11 is a superconducting film heat generating sheet, a positive temperature coefficient (PTC) thermistor, or other electro-heat materials, such as tungsten filament and a thermal electric material. Optionally, an upper adhesive film 121 is formed between a front side of the metal layer 11 and the upper absorbent material layer 131, and a lower adhesive film 122 is formed between a reverse side of the metal layer 11 and the lower absorbent material layer 132. In an embodiment, the upper adhesive film 121 and the lower adhesive film 122 are made of thermally conductive, heat-proof and insulating materials, such as 0.075 mm(Acrylic)+0.05 mm(PET)+0.075 mm(Acrylic), with Acrylic replaceable by high-temperature resistant polymer silicone and PET replaceable by PI.

In formation, the upper and lower absorbent material layers 131 and 132 are in the shape of particles, applied onto the upper adhesive film 121 and the lower adhesive film 122, and adhered to the metal layer 11. In an embodiment, the upper adhesive film 121 and the lower adhesive film 122 are 0.16-0.25 mm in thickness, the metal layer 11 is 0.03-0.08 mm in thickness, the absorbent material 14 formed to be an absorbent material layer has a particle diameter equal to 0.3-0.5 mm, and the rolled absorbent material 14 will be compressed flat. In another embodiment, the absorbent material 14 that will act as an absorbent material layer is applied onto the adhesive film 121 and the lower adhesive film 122 quickly and evenly.

Referring to FIG. 2, a schematic diagram of a raw base material according to the disclosure is provided. Before the absorbent material 14 of FIG. 1 is applied onto the upper adhesive film 121 and the lower adhesive film 122, there must be a raw base material 2. The raw base material 2 includes a metal layer 21, an upper adhesive film 221, a lower adhesive film 222, an upper release film 231 and a lower release film 232. The metal layer 21, the upper adhesive film 221 and the lower adhesive film 222 have the material characteristics as those of FIG. 1. In an embodiment, the upper release film 231 and the lower release film 232 are adhered to the upper adhesive film 221 and the lower adhesive film 222, respectively.

The raw base material 2 can be rolled into the shape of a cylinder for easy storage. The upper release film 231 and the lower release film 232 will not be released from the upper adhesive film 221 and the lower adhesive film 222, respectively, until the absorbent material 14 is going to be applied onto the upper adhesive film 221 and the lower adhesive film 222.

Figure 3:
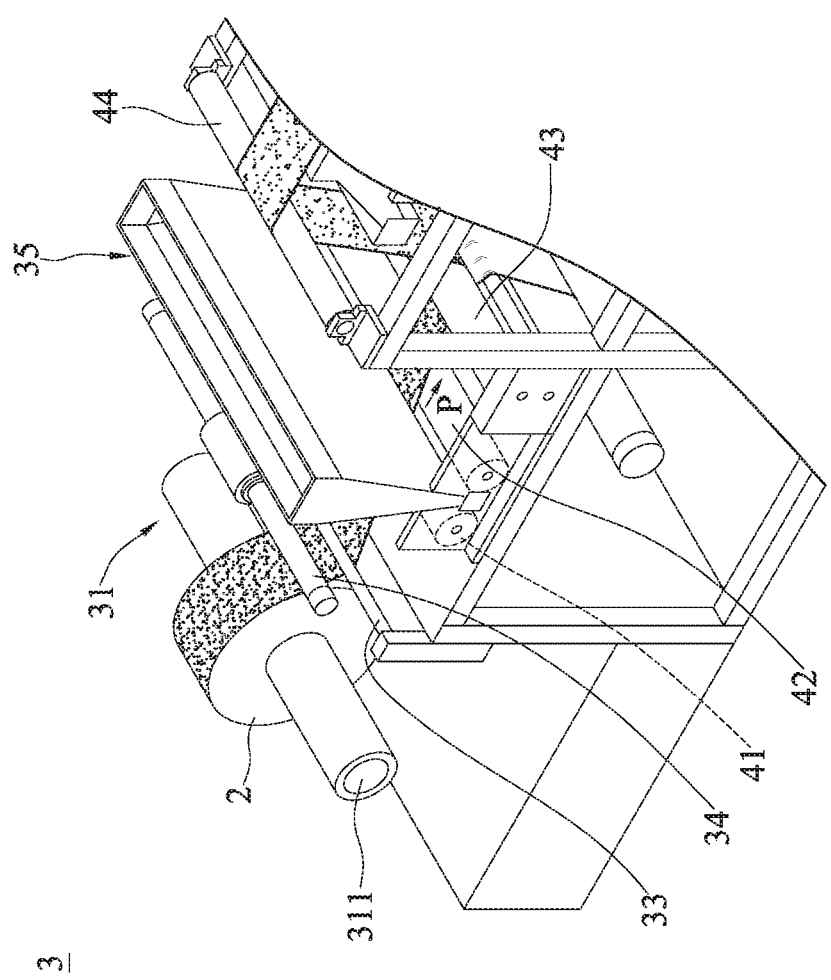
FIG. 3 is a schematic diagram of a front structure of a dehumidifying base material forming device according to the disclosure.
Figure 4:
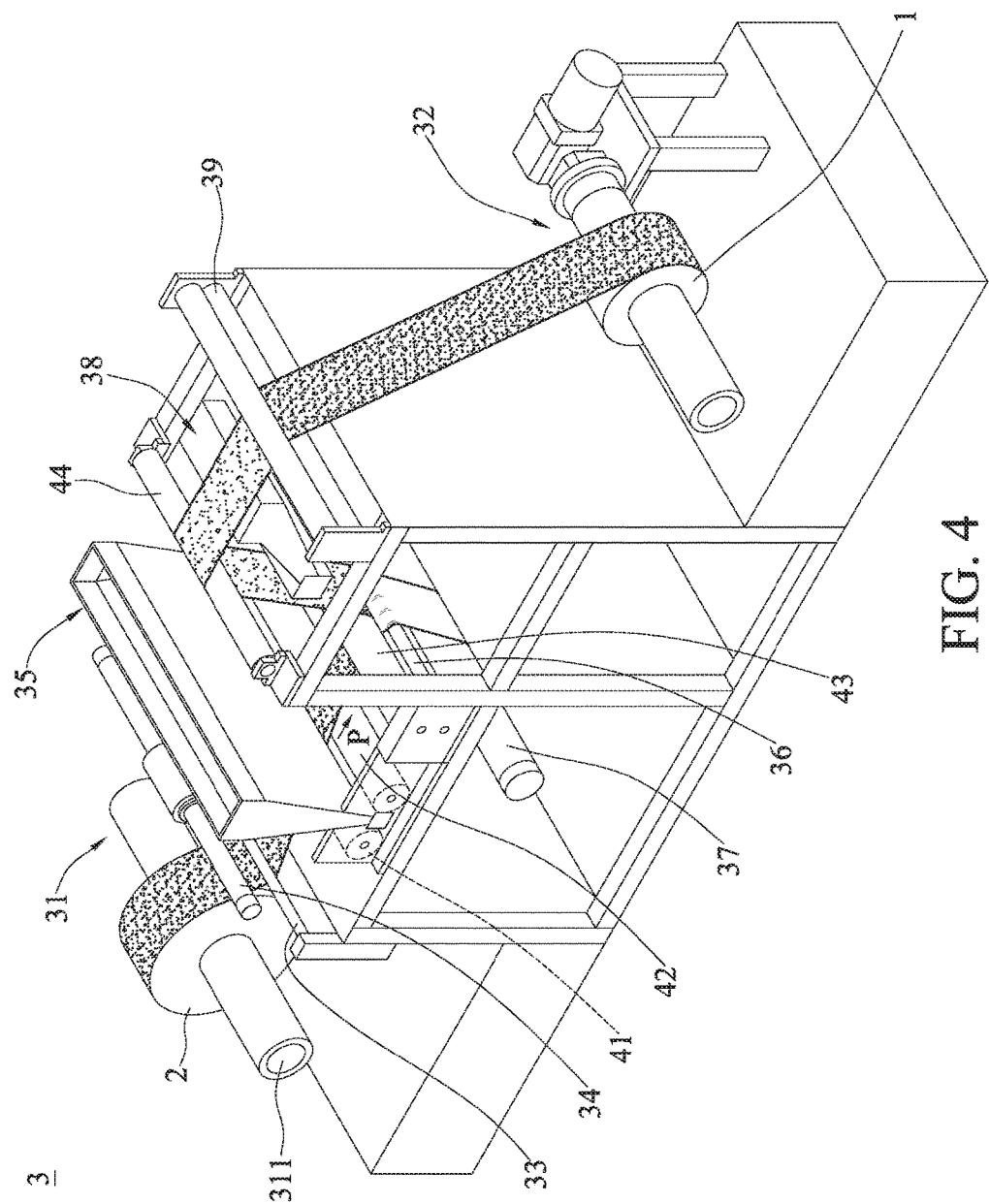
FIG. 4 is a schematic diagram of a dehumidifying base material forming device according to the disclosure.

Referring to FIG. 3, a schematic diagram of a front-stage structure of a dehumidifying base material forming device according to the disclosure is provided. FIG. 4 illustrates a dehumidifying base material forming device 3 according to the disclosure. Please also refer to FIGS. 1 and 2. The dehumidifying base material forming device 3 comprises a material placement part 31, a base material rolling part 32, a first release roller 33, an upper release film rolling part 34, an upper absorbent adhesive part 35, a second release roller 36, a lower release film rolling part 37, a lower absorbent adhesive part 38 and a compression roller set 39. The upper release film rolling part 34 is positioned around a travelling route P of the raw base material 2 beyond the material placement part 31. The upper absorbent adhesive part 35 discharges the absorbent material 14 onto the upper adhesive film 121, and is positioned around a travelling route P of the raw base material 2 beyond the upper release film rolling part 34 after the upper release film 231 is released. The lower release film rolling part 37 is positioned around a travelling route P of the raw base material 2 beyond the upper absorbent adhesive part 35. The lower absorbent adhesive part 38 discharges the absorbent material 14 onto the lower adhesive film 122 and is positioned around a travelling route P of the raw base material 2 beyond the lower release film rolling part 37 after the lower release film 232 is released. The base material rolling part 32 is positioned at an end of a travelling route P of the dehumidifying base material 1 beyond the compression roller set 39.

In an embodiment, the first release roller 33 is positioned at a travelling route P of the raw base material 2 between the material placement part 31 and the upper absorbent adhesive part 35, and the second release roller 36 is positioned at a travelling route P of the raw base material 2 between the upper absorbent adhesive part 35 and the lower absorbent adhesive part 38. In an embodiment, the dehumidifying base material forming device 3 further has a roller set disposed at a traveling route P of the raw base material 2 or the dehumidifying base material 1, and is in contact with the raw base material 2 or the dehumidifying base material 1, to drive the raw base material 2 or the dehumidifying base material 1 to move forward, which will be described in the following paragraphs. The compression roller set 39 is positioned at a travelling route P of the dehumidifying base material 1 beyond the lower absorbent adhesive part 38, and is in contact with the absorbent material 14 of the dehumidifying base material 1, to compress the dehumidifying base material 1 having the upper adhesive film and the lower adhesive film that have the absorbent material applied thereonto.

Please also refer to the raw base material 2 of FIG. 2. In operation, the raw base material 2 is placed on the material placement part 31; the raw base material 2 is in the shape of a cylinder, and is mounted onto a revolving axle 311 of the material placement part 31; the raw base material 2 passes the first release roller 33, allowing the upper release film 231 of the raw base material 2 to be released from the raw base material 2 and rolled by the upper release film rolling part 34; then, the raw base material 2 passes the upper end of the first roller 41 and the upper absorbent adhesive part 35, allowing the absorbent material 14 (as shown in FIG. 1) to be applied onto the upper adhesive film 221 of the raw base material 2, so as to form the upper absorbent material layer 131 shown in FIG. 1; then, the raw base material 2 passes the upper end of the second roller 42 and the second release roller 36, allowing the lower release film 232 to be released from the raw base material 2 and rolled by the lower release film rolling part 37; and then, the raw base material 2 passes the lower end of the third roller 43 and the lower absorbent adhesive part 38, allowing the absorbent material 14 to be applied onto the lower adhesive film 222 of the raw base material 2, so as to form the lower absorbent material layer 132 shown in FIG. 1. Therefore, a preliminary dehumidifying base material 1 is formed.

Lastly, the dehumidifying base material 1 passes the upper end of the fourth roller 44 and compressed by the compression roller set 39, to compress the absorbent material 14 flat, such that the absorbent material 14 is securely adhered to the upper adhesive film 221 and the lower adhesive film 222, and the base material rolling part 32 can roll the dehumidifying base material 1. Before the absorbent material 14 (as shown in FIG. 1) is applied onto the upper adhesive film 221 of the raw base material 2, the upper release film 231 has to be released manually and fixed to the upper release film rolling part 34. After the raw base material 2 passes the upper absorbent adhesive part 35, the lower release film 232 is released and fixed to the lower release film rolling part 37. After passing the lower absorbent adhesive part 38, the raw base material 2 with the upper release film 231 and the lower release film 232 released is fixed onto the base material rolling part 32.

Figure 5:
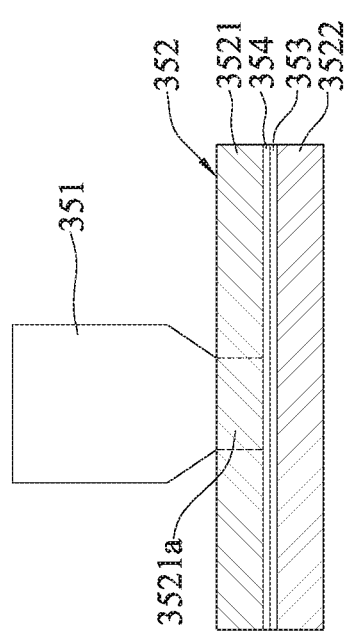
FIG. 5 is a schematic diagram of an upper absorbent adhesive part according to the disclosure.

Referring to FIG. 5, a schematic diagram of an upper absorbent adhesive part according to the disclosure is provided. Please also refer to FIGS. 2-4. The upper absorbent adhesive part 35 includes a first material bucket 351 and a first material discharging seat 352. Optionally, a detector (not shown) is provided under the first material bucket 351 and detects whether the absorbent material 14 is used up. The first material discharging seat 352 further comprises a first upper material discharging seat 3521, a first lower material discharging seat 3522, a feller gage 353 and a controlling panel 354.

A hole 3521a is formed in a center inside the upper material discharging seat 3521 to receive the absorbent material 14 fell from the first material bucket 351. In an embodiment, the upper material discharging seat 3521 and the lower material discharging seat 3522 are spaced at an interval equal to a particle diameter of the absorbent material 14 added by a total thickness of the upper adhesive film 221, the metal layer 21, the lower adhesive film 222 and the lower release film 232. The feller gage 353 adjusts the interval according to the thickness of the raw base material 2, in order for the raw base material 2 to pass through the interval. The controlling panel 354 controls the absorbent material 14 to be discharged through the hole 3521a of the first upper material discharging seat 3521 onto the upper adhesive film 221 evenly.

The lower absorbent adhesive part 38 includes a second material bucket and a second material discharging seat. The second material discharging seat includes a second upper material discharging seat, a second lower material discharging seat, a feller gage and a controlling panel. The lower absorbent adhesive part 38 has similar constituents to the upper absorbent adhesive part 35, further description thereof hereby omitted. In an embodiment, the second upper material discharging seat and the second lower material discharging seat are spaced at an interval equal to two times of a particle diameter of the absorbent material 14 added by a total thickness of the upper adhesive film 231, the metal layer 21 and the lower adhesive film 232. The feller gage adjusts the thickness of the raw base material 2 according to the interval, in order for the raw base material 2 to pass through the interval. The controlling panel controls the absorbent material 14 to be discharged through the hole of the second upper material discharging seat onto the lower adhesive film 222 evenly.

Figure 6:
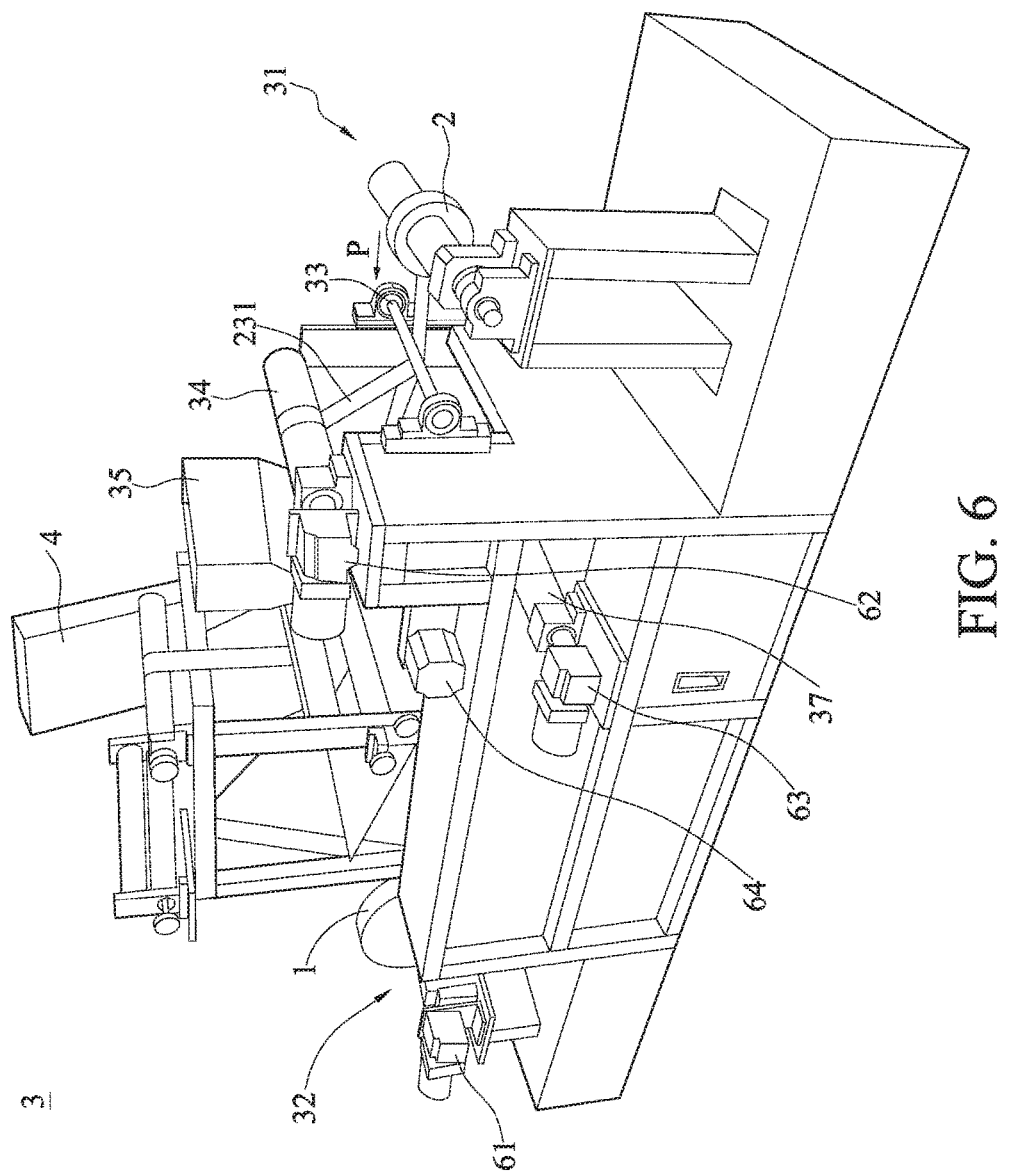
FIG. 6 is a schematic diagram of dynamic motors of a dehumidifying base material forming device according to the disclosure.

Referring to FIG. 6, a schematic diagram of dynamic motors of a dehumidifying base material forming device according to the disclosure is provided. The base material rolling part dynamic motor 61 controls the rotation of the base material rolling part 32. The upper release film rolling part dynamic motor 62 and the lower release film rolling part dynamic motor 63 supply power to and rotate the upper release film rolling part 34 and the lower release film rolling part 37, respectively.

Figure 8:
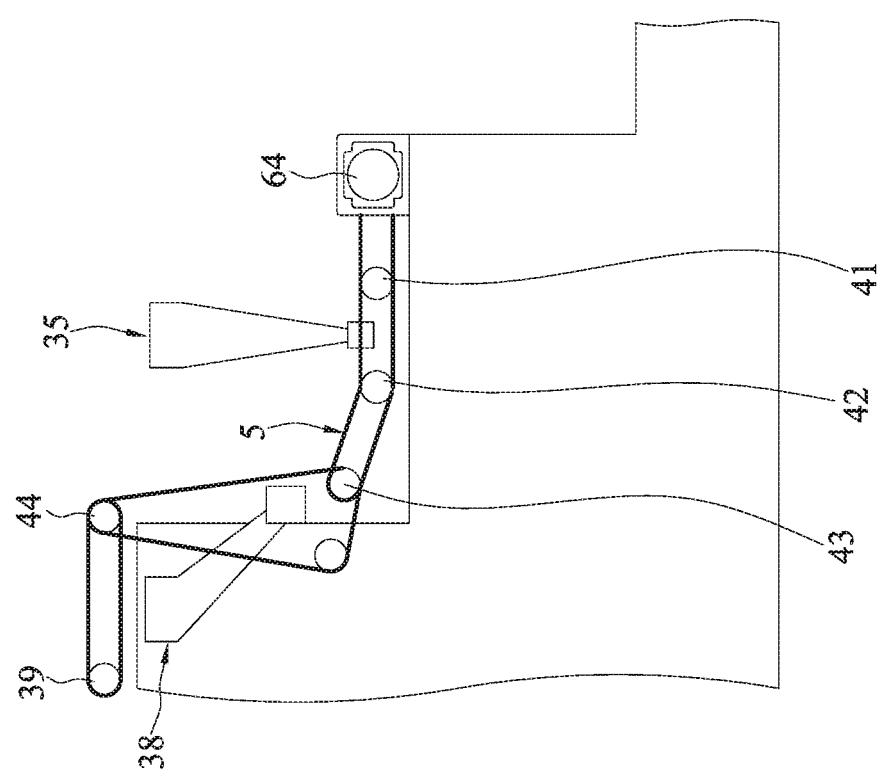
FIG. 8 is a schematic diagram of a belt transmission system of a roller set according to the disclosure.

Referring to FIG. 8, a schematic diagram of a roller set belt transmission system according to the disclosure is provided. A roller dynamic motor 64, via a belt transmission system 5, controls first to fourth rollers 41, 42, 43 and 44 and a compression roller set 39 to rotate at the same speed, to drive the raw base material 2 to move forward. In an embodiment, a detector is disposed at the material placement part 31, and detects whether the raw base material 2 is used up. For instance, as the diameter of the raw base material 2 rolled in the shape of a cylinder is less than a predefined value, it is determined that the raw base material 2 is going to be used up. In another embodiment, a detector is disposed above the raw base material 2 between the upper absorbent adhesive part 35 and the lower absorbent adhesive part 38, and detects whether the raw base material 2 is going to be used up.

As shown in FIG. 6, the dehumidifying base material forming device 3 further comprises a controlling module 4 that controls the rotation speed of an upper release film rolling part dynamic motor 62, a lower release film rolling part dynamic motor 63, a base material rolling part dynamic motor 61, and a roller dynamic motor 64 that supply power to the upper release film rolling part 34, the lower release film rolling part 37, the base material rolling part 32, and the rollers and compression rollers, respectively. The controlling module 4 may be a touchable or mechanical controlling panel, which controls the rotation speeds of the four dynamic motors, i.e., adjusting the whole processing speed of the dehumidifying base material. In an embodiment, the rotation speeds of the dynamic motors are in a specified ratio, and the rotation speeds of the four dynamic motors can be controlled by setting and fixing a single selection item.

Figure 7:
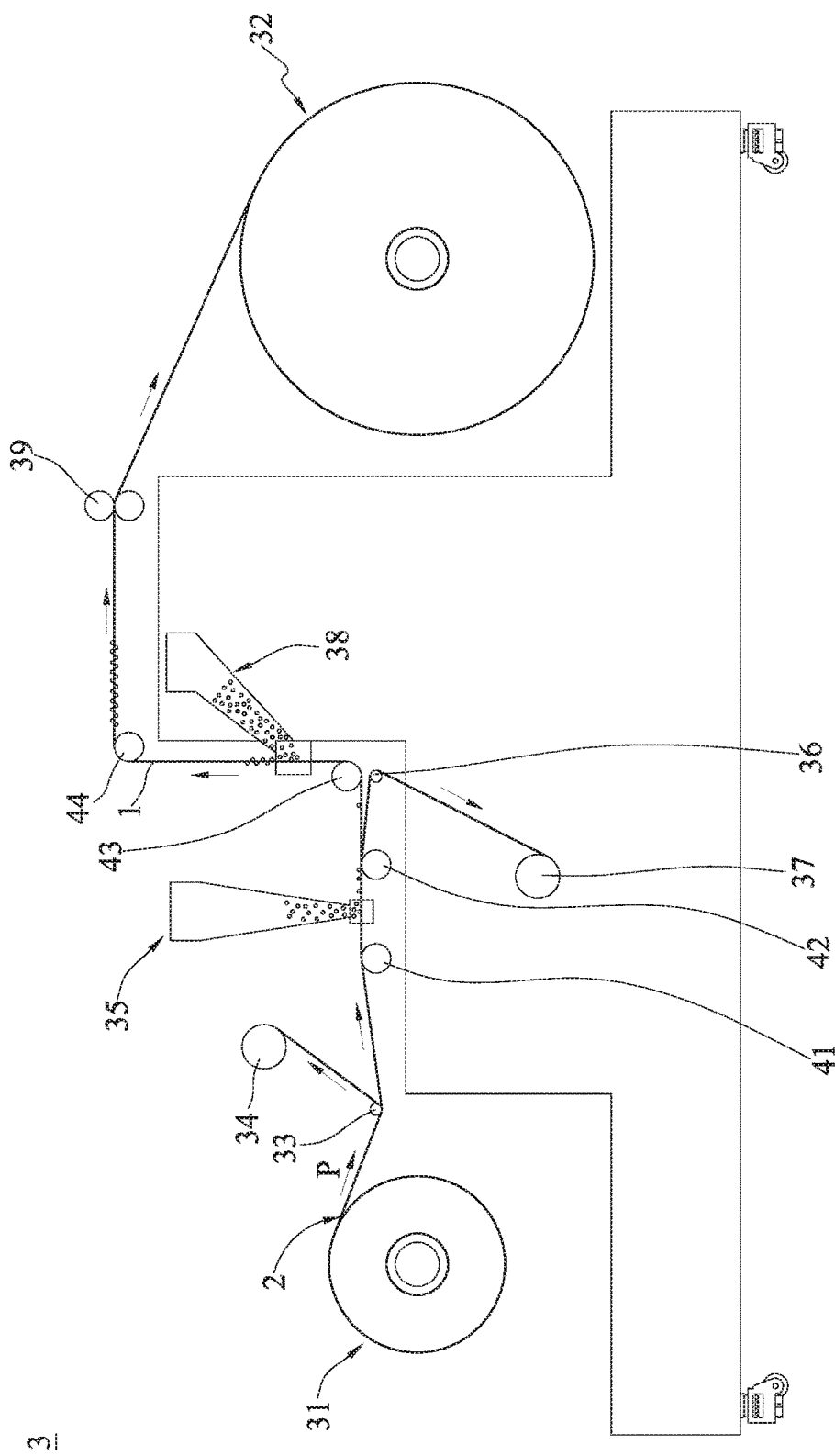
FIG. 7 is a schematic diagram illustrating the operation of a dehumidifying base material forming device according to the disclosure.

Referring to FIG. 7, a schematic diagram illustrating the operation of a dehumidifying base material forming device according to the disclosure is provided. Please also refer to FIGS. 1 and 2. The raw base material 2 is placed on the material placement part 31. When the raw base material 2 passes under the first release roller 33, the upper release film 231 is released from the raw base material 2, and rolled by the upper release film rolling part 34. Then, the raw base material 2 horizontally enters the upper absorbent adhesive part 35 via the first roller 41, and the absorbent material 14 in the upper absorbent adhesive part 35 will be applied onto the upper adhesive film 221 of the raw base material 2. Then, the raw base material 2 horizontally passes the second roller 42.

When the raw base material 2 passes the second release roller 36, the lower release film 232 is released from the raw base material 2, and rolled by the lower release film rolling part 37. Then, the raw base material 2 passes under the third roller 43 and changes its travelling direction, and vertically enters the lower absorbent adhesive part 38, such that the volume and size of the dehumidifying base material forming device 3 can be reduced. The absorbent material 14 in the lower absorbent adhesive part 38 is applied onto the lower adhesive film 222 of the raw base material 2 laterally. The upper and lower adhesive films 221 and 222 of the raw base material 2 have the absorbent material applied thereonto. Therefore, the preliminary dehumidifying base material 1 is complete.

The dehumidifying base material 1 having the absorbent material 14 applied onto two sides thereof passes above the fourth roller 44 and changes its travelling direction. The compression roller set 39 compresses the dehumidifying base material 1, allowing the absorbent material 14 to be securely applied onto the upper adhesive film 221 and the lower adhesive film 222 of the raw base material 2. Lastly, the dehumidifying base material rolling part 32 rolls the dehumidifying base material 1. In an embodiment, a detector is disposed at the dehumidifying base material rolling part 32, and detects the diameter of the rolled dehumidifying base material 1, to determine whether the dehumidifying base material 1 is manufactured completely.

Figure 9:
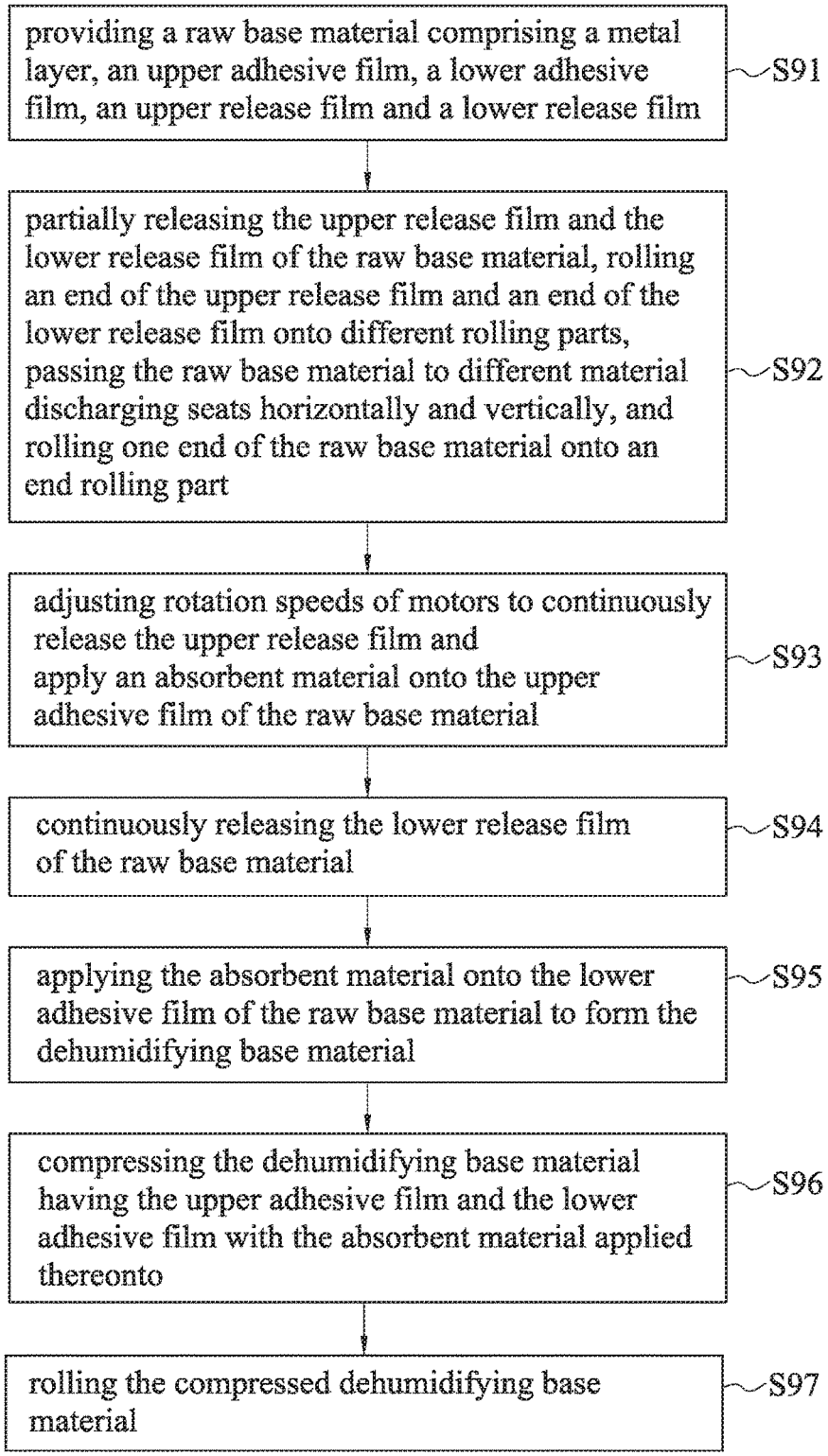
FIG. 9 is a flow chart of a method for forming a dehumidifying base material according to the disclosure.

Referring to FIG. 9, a flow chart of a method for forming a dehumidifying base material according to the disclosure is provided. In step S91, a raw base material comprising a metal layer, an upper adhesive film, a lower adhesive film, an upper release film and a lower release film is provided. In the raw base material, the upper adhesive film and the lower adhesive film are attached to two surfaces of the metal layer, respectively, and an upper release film and a lower release film are attached to the upper adhesive film and the lower adhesive film, respectively. The raw base material can be rolled in the shape of a cylinder for easy storage, and mounted onto the material placement part 31 shown in FIG. 7 when a formation process of a dehumidifying base material is going to be performed.

In step S92, upon performance of a formation process of a dehumidifying base material, the upper release film and the lower release film of the raw base material are released first. The upper release film and the lower release film are used to isolate the upper adhesive film and the lower adhesive film, respectively, from being adhered to external things. Therefore, in order to join an absorbent material with the raw base material, the upper release film and the lower release film of the raw base material have to be released first, of course, such that the absorbent material can be adhered to the upper adhesive film and the lower adhesive film. The released upper release film and lower release film are rolled onto an upper release film rolling part and a lower release film rolling part, respectively. The raw base material with the upper release film and the lower release film released horizontally passes an upper material discharging seat and vertically passes a lower material discharging seat. The raw base material is then rolled onto a dehumidifying base material rolling part.

In step S93, the rotations speeds of motors are adjusted, and the absorbent material is applied onto the upper adhesive film of the raw base material after the upper adhesive film is released. In step S93, the absorbent material is applied onto the upper adhesive film after the upper adhesive film is released. As shown in FIG. 5, a feller gage adjusts the interval between an upper material discharging seat and a lower material discharging seat, such that the fell absorbent material can be applied evenly, without wasting.

In step S94, the lower release film of the raw base material is released, and the absorbent material is adhered to the lower adhesive film. In step S94, the lower release film is released from the raw base material.

In step S95, the absorbent material is applied onto the lower adhesive film of the raw base material, and a dehumidifying base material is formed. Following step S94, after the lower release film is released, the absorbent material is also applied onto the lower adhesive film evenly. One of ordinary skills in the art can refer to FIG. 5 to learn how to apply the absorbent material evenly, further description hereby omitted.

In step S96, the dehumidifying base material having the upper adhesive film and the lower adhesive film that have the absorbent material applied thereonto is compressed. In step S96, the absorbent material onto the raw base material that is going to be formed as the dehumidifying base material is further compressed. Since in steps S93 and S95 the absorbent material is fell onto the upper adhesive film and the lower adhesive film and only the upper adhesive film and the lower adhesive film are used to adhere the absorbent material to the upper adhesive film and the lower adhesive film, in step S96 the basic dehumidifying base material is compressed by the compression roller set 39 shown in FIG. 7, in order to securely adhere the absorbent material to the upper adhesive film and the lower adhesive film.

In step S97, the compressed the dehumidifying base material is rolled. Also refer to FIG. 7. The compressed dehumidifying base material is a finished dehumidifying base material. In order for the dehumidifying base material to be stored easily, the dehumidifying base material is rolled into the shape of a cylinder. Therefore, the cylindrical dehumidifying base material can be used in a dehumidifying component (dehumidifying apparatus inner component) in the near future.

In addition to improving the quality of a dehumidifying base material, the disclosure further provides a dehumidifying base material forming device and a method for forming a dehumidifying base material. An absorbent material is applied onto an upper adhesive film and a lower adhesive film of a raw base material in a simple process. A feller gage adjusts the position of the controlling panel, and a material discharging interval that corresponds to the particle diameter of only one absorbent material exists when the raw base material passes the upper and lower absorbent adhesive parts. The absorbent material can be fell and applied onto the upper and lower adhesive films in a great amount. Since the material discharging interval is about the particle diameter of the absorbent material, no excess absorbent material will be fell onto the upper and lower adhesive films. Therefore, the problems of the prior art that much of the absorbent material is wasted and the absorbent material is applied unevenly are solved. As such, the dehumidifying base material can be formed automatically, and the raw material is saved and the yield is increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dehumidifying base material, comprising:
   a metal layer;
   an upper adhesive film attached to a side surface of the metal layer;
   a lower adhesive film attached to another side surface of the metal layer;
   an upper absorbent material layer attached to the upper adhesive film; and
   a lower absorbent material layer attached to the lower adhesive film,
   wherein the metal layer is a superconducting film heat generating sheet or a positive temperature coefficient thermistor.

2. The dehumidifying base material of claim 1, wherein the upper adhesive film and the lower adhesive film are each made of acrylic plus polyethylene terephthalate (PET) or silicone plus PET.

3. The dehumidifying base material of claim 1, wherein the upper absorbent material layer and the lower absorbent material layer are made of a porous material composed of silica gel, activated aluminum oxide, zeolite or active carbon.

4. The dehumidifying base material of claim 1, wherein the upper adhesive film and the lower adhesive film are each 0.16-0.25 mm in thickness.

5. The dehumidifying base material of claim 1, wherein the metal layer is 0.03-0.08 mm in thickness.

6. The dehumidifying base material of claim 1, wherein the upper absorbent material layer and the lower absorbent material layer comprise an absorbent material having a particle diameter from 0.3 mm to 0.5 mm.

7. A device for forming a dehumidifying base material, comprising:
   a material placement part configured to place a raw base material comprising a metal layer, an upper adhesive film, a lower adhesive film, an upper release film, and a lower release film;
   an upper release film rolling part configured to roll the upper release film and positioned around a travelling route of the raw base material beyond the material placement part;
   an upper absorbent adhesive part configured to discharge an absorbent material onto the upper adhesive film and positioned around a travelling route of the raw base material beyond the upper release film rolling part after the upper release film being released, the upper absorbent adhesive part further comprising a first material bucket having an absorbent material contained therein and a first material discharging seat;
   a lower release film rolling part configured to roll the lower release film and positioned around a traveling route of the raw base material beyond the upper absorbent adhesive part;
   a lower absorbent adhesive part configured to discharge the absorbent material onto the lower adhesive film and positioned around a travelling route of the raw base material beyond the lower release film rolling part after the lower release film being released, the lower absorbent adhesive part further comprising a second material bucket having the absorbent material contained therein and a second material discharging seat;
   a roller set disposed along the travelling route of the raw base material or a travelling route of the dehumidifying base material and being in contact with the raw base material or the dehumidifying base material to drive the raw base material or the dehumidifying base material to move forward;
   a compression roller set positioned at the travelling route of the dehumidifying base material beyond the lower absorbent adhesive part and being in contact with the absorbent material of the dehumidifying base material to compress the dehumidifying base material having the upper adhesive film and the lower adhesive film with the absorbent material applied thereon; and
   a base material rolling part positioned at an end of the travelling route of the dehumidifying base material beyond the compression roller set and configured to roll the dehumidifying base material compressed by the compression roller set.

8. The device of claim 7, further comprising a first dynamic motor configured to supply power to the upper release film rolling part and a second dynamic motor configured to supply power to the lower release film rolling part.

9. The device of claim 8, further comprising a third dynamic motor configured to supply power to the base material rolling part.

10. The device of claim 9, further comprising a fourth dynamic motor configured to rotate the roller set and the compression roller set via a belt transmission system.

11. The device of claim 10, further comprising a controlling module configured to control rotation speeds of the first, second, third, and fourth dynamic motors.

12. The device of claim 7, further comprising a first release roll disposed on the travelling route of the raw base material between the material placement part and the upper absorbent adhesive part.

13. The device of claim 7, further comprising a second release roll disposed on the traveling route of the raw base material between the upper absorbent adhesive part and the lower absorbent adhesive part.

14. The device of claim 7, wherein the first material discharging seat of the upper absorbent adhesive part comprises a first upper material discharging seat and a first lower material discharging seat spaced apart at a first interval equal to a diameter of the absorbent material added by a total thickness of the upper adhesive film, the metal layer, the lower adhesive film and the lower release film.

15. The device of claim 14, wherein the second material discharging seat of the lower absorbent adhesive part comprises a second upper material discharging seat and a second lower material discharging seat spaced apart at a second interval equal to two times of the diameter of the absorbent material added by a total thickness of the upper adhesive film, the metal layer and the lower adhesive film.

16. The device of claim 15, further comprising a first feller gage and a second feller gage configured to control the first interval and the second interval, respectively.

17. The device of claim 15, further comprising a first controlling panel disposed between the first upper material discharging seat and the first lower material discharging seat and a second controlling panel disposed between the second upper material discharging seat and the second lower material discharging seat for controlling the absorbent material to evenly fall onto the upper adhesive film and the lower adhesive film.

18. The device of claim 7, further comprising a detector configured to detect a diameter of the raw base material on the material placement part and a diameter of the dehumidifying base material on the base material rolling part.

19. A method for forming a dehumidifying base material, comprising:
   providing a raw base material comprising a metal layer, an upper adhesive film, a lower adhesive film, an upper release film and a lower release film;
   partially releasing the upper release film and the lower release film of the raw base material, and rolling an end of the upper release film and an end of the lower release film onto different rolling parts;
   passing the raw base material to different material discharging seats horizontally and vertically;
   rolling one end of the raw base material onto an end rolling part;
   adjusting rotation speeds of motors to continuously release the upper release film and apply an absorbent material onto the upper adhesive film of the raw base material;
   continuously releasing the lower release film of the raw base material;
   applying the absorbent material onto the lower adhesive film of the raw base material to form the dehumidifying base material;
   compressing the dehumidifying base material having the upper adhesive film and the lower adhesive film with the absorbent material applied thereonto; and
   rolling the compressed dehumidifying base material.

* * * * *